(12) United States Patent
Terada et al.

(10) Patent No.: US 7,852,501 B2
(45) Date of Patent: Dec. 14, 2010

(54) INFORMATION PROCESSING APPARATUS AND INFORMATION PROCESSING METHOD

(75) Inventors: Naomi Terada, Setagaya-ku (JP); Katsuhiko Yanagawa, Inagi (JP); Masahiro Ishiyama, Sanjo (JP); Michio Fukushima, Yokohama (JP); Hiroyuki Tsuji, Yokohama (JP); Yoshihisa Nomura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1052 days.

(21) Appl. No.: 11/249,595

(22) Filed: Oct. 13, 2005

(65) Prior Publication Data

US 2006/0087675 A1 Apr. 27, 2006

(30) Foreign Application Priority Data

Oct. 26, 2004 (JP) .............................. 2004-311412

(51) Int. Cl.
*G06F 3/12* (2006.01)

(52) U.S. Cl. ................... 358/1.14; 358/1.15; 358/1.1; 713/310; 713/300; 713/320; 713/323

(58) Field of Classification Search ................ 358/1.14, 358/1.15, 1.1; 713/310, 300, 320, 323
See application file for complete search history.

(56) References Cited

U.S. PATENT DOCUMENTS

| 5,809,369 | A | 9/1998 | Furuya et al. |
| 5,937,148 | A | 8/1999 | Okazawa |
| 6,813,037 | B1 | 11/2004 | Collard |
| 7,286,252 | B2 * | 10/2007 | Kawabuchi et al. ......... 358/1.15 |
| 2002/0138564 | A1 * | 9/2002 | Treptow et al. ............. 709/203 |
| 2003/0053112 | A1 * | 3/2003 | Motosugi et al. ........... 358/1.14 |
| 2004/0263895 | A1 * | 12/2004 | Tomita et al. .............. 358/1.14 |
| 2005/0030582 | A1 * | 2/2005 | Xu ........................... 358/1.15 |

FOREIGN PATENT DOCUMENTS

| JP | 8-137637 A | 5/1996 |
| JP | 08-212029 A | 8/1996 |
| JP | 09-185299 A | 7/1997 |
| JP | 2000-066862 A | 3/2000 |
| JP | 2002-247062 A | 8/2002 |
| JP | 2003-242055 A | 8/2003 |
| JP | 2003-316557 A | 11/2003 |

* cited by examiner

*Primary Examiner*—King Y Poon
*Assistant Examiner*—Paul F Payer
(74) *Attorney, Agent, or Firm*—Canon U.S.A., Inc. I.P Division

(57) ABSTRACT

When a print processing apparatus is in a power saving mode, an information processing apparatus informs, for the print processing apparatus, the user that the print processing apparatus is in the power saving state. It can thus be made known to the user that the print processing apparatus is in the power saving state.

7 Claims, 8 Drawing Sheets

INFORMATION PROCESSING APPARATUS AND INFORMATION PROCESSING METHOD

BACKGROUND OF THE INVENTION

1. Field of the Invention

The present invention relates to an information processing apparatus, method and program for informing a user that a print processing apparatus, such as a printer controller or a print server, is in a power saving state.

2. Description of the Related Art

To reduce power consumption, image forming apparatuses are generally capable of switching from a normal state ready for immediate printing to a power saving state for saving power.

For example, Japanese Patent Laid-Open No. 8-137637 (corresponding U.S. Pat. No. 5,937,148) discloses an image forming apparatus with an interface that informs a host personal computer (PC) that a controller of the image forming apparatus is in power saving state.

A print processing apparatus, such as a printer controller or a print server, externally connected to an image forming apparatus, needs to process a large amount of data at high speed. Therefore, unlike general image forming apparatuses, a print processing apparatus incorporates a PC-based architecture with a high-performance central processing unit (CPU) and motherboard. Since such a print processing apparatus includes an operating system (OS) (general-purpose OS, such as WINDOWS XP) generally running on PCs, a longer time is required for recovery from a power saving state than that in the case of an image forming apparatus requiring less time for recovery. Therefore, a print processing apparatus externally connected to an image forming apparatus does not support power saving mode. Even if the user does not perform a print operation for extended periods of time, the print processing apparatus needs to maintain standby mode to always receive print requests from a host PC, and thus wastes power.

If placed in a power saving state, the print processing apparatus cannot receive a print request from the host PC and a timeout occurs. However, the user who has sent the print request from the host PC is not informed of the cause of the timeout (the print request has not been received because the print processing apparatus is in a power saving state).

It is therefore convenient if the user is informed of the cause of a timeout that has occurred because, for example, the print processing apparatus in a power saving state has not received a print request. Or it is convenient if the power saving state is released in accordance with the print request.

SUMMARY OF THE INVENTION

In one aspect of the present invention, an information processing apparatus connected to a print processing apparatus controlling print processing includes a determining unit configured to determine whether or not the print processing apparatus is in a power saving state; a monitoring unit configured to monitor a print request from an external apparatus to the print processing apparatus; and an informing unit configured to inform the external apparatus, when the monitoring unit detects that a print request has been sent to the print processing apparatus in the power saving state, that the print processing apparatus is in the power saving state.

In another aspect of the present invention, an information processing apparatus connected to a print processing apparatus controlling print processing includes a determining unit configured to determine whether or not the print processing apparatus is in a power saving state; a monitoring unit configured to monitor a print request from an external apparatus to the print processing apparatus; and a control-data sending unit configured to send data for releasing the power saving state to the print processing apparatus, when the monitoring unit detects that a print request has been sent to the print processing apparatus in the power saving state.

In another aspect of the present invention, a printer connected to a print processing apparatus controlling print processing includes a determining unit configured to determine whether or not the print processing apparatus is in a power saving state; a monitoring unit configured to monitor a request from an external apparatus to the print processing apparatus; and an informing unit configured to inform the external apparatus, when the monitoring unit detects that a request has been sent to the print processing apparatus in the power saving state, that the print processing apparatus is in the power saving state.

In another aspect of the present invention, an information processing method for an information processing apparatus connected to a print processing apparatus controlling print processing includes a determining step of determining whether or not the print processing apparatus is in a power saving state; a monitoring step of monitoring a print request from an external apparatus to the print processing apparatus; and an informing step of informing the external apparatus, when the monitoring step detects that a print request has been sent to the print processing apparatus in the power saving state, that the print processing apparatus is in the power saving state.

In another aspect of the present invention, a program has a computer execute the information processing method.

In another aspect of the present invention, a computer-readable recording medium records the program.

Further features of the present invention will become apparent from the following description of exemplary embodiments with reference to the attached drawings.

DESCRIPTION OF THE EMBODIMENTS

Various embodiments and aspects of the present invention will now be described in detailed with reference to the attached drawings.

First Exemplary Embodiment

Figure 1:
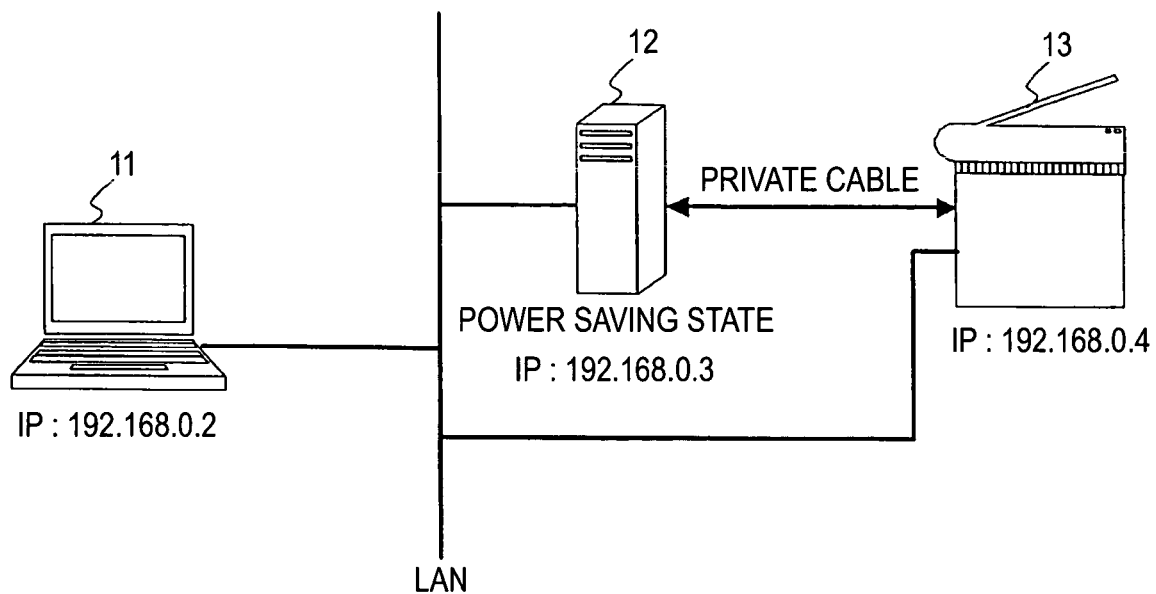
FIG. 1 shows an exemplary architecture of an image forming system according to first and second embodiments of the present invention.

FIG. 1 shows an exemplary architecture of an image forming system according to the first exemplary embodiment of the present invention. In the first embodiment, when a host PC 11 sends a print job request to a printer controller 12 in a power saving state, an image forming apparatus 13 allows a screen 21 (see FIG. 2) with communicative data to be displayed on the host PC 11. Here, it is noted that a printer controller 12 and an image forming apparatus 13 are shown merely as examples of a print processing apparatus and an information processing apparatus, respectively; however, the print processing apparatus may also be comprised of other various components which accomplish the functional equivalent.

Still referring to FIG. 1, the host PC 11, the printer controller 12, and the image forming apparatus 13 are connected to a local area network (LAN). The printer controller 12 and the image forming apparatus 13 are connected to each other via a private cable. According to an exemplary user operation, the host PC 11 creates a print job containing data in a printer control language, such as a page description language (PDL), or data in a specific format (data compressed using a joint bi-level image experts group (JBIG) algorithm or the like). Then the host PC 11 sends the print job to the printer controller 12. Upon receipt of the print job from the host PC 11, the printer controller 12 expands the print job to create raster image data. The printer controller 12 sends print data based on the raster image data to the image forming apparatus 13 via the private cable. The image forming apparatus 13 then performs printing based on the print data.

The printer controller 12 (assigned an IP address of 192.168.0.3 for illustrative purposes) is connected to the image forming apparatus 13 (assigned an IP address of 192.168.0.4 for illustrative purposes). Before entering a power saving state, the printer controller 12 sends, to the image forming apparatus 13, data for informing that the power saving state is about to be entered. In the power saving state, electric power is not supplied to a main circuit element of the printer controller 12 and the printer controller enters a power saving state. As a result, the power to be consumed by the printer controller 12 can be dramatically saved.

Figure 9:
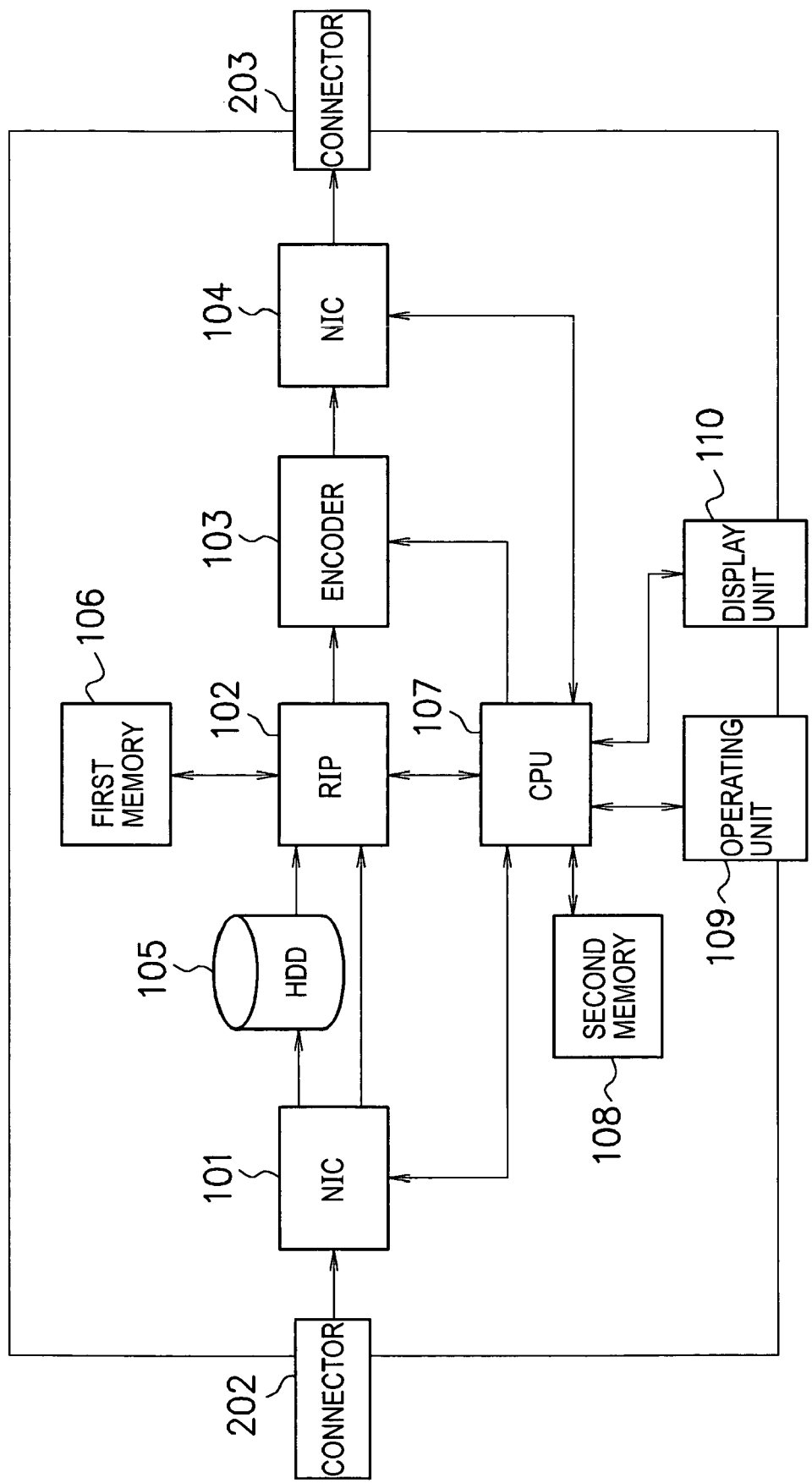
FIG. 9 is a block diagram showing an exemplary control structure of a printer controller.

FIG. 9 is a block diagram showing an exemplary control architecture of the printer controller 12. A connector 202 is adapted to be connected to the LAN, while a connector 203 is adapted to be connected to the private cable. A network interface card (NIC) 101 serves as a first interface for lower layer level connection to the LAN. A raster image processor (RIP) 102 creates raster image data based on received data in a printer control language, such as a PDL, or in a specific format (data compressed using a JBIG algorithm or the like). An encoder 103 converts raster image data into print data or data in a format supported by the image forming apparatus 13. An NIC 104 serves as a second interface for lower layer level connection to the private cable. A hard disk drive (HDD) 105 (or any other suitable form of memory) temporarily stores (spooling) a print job received by the NIC 101. A first memory 106 is used when the RIP 102 performs image expansion. A CPU 107 is provided to control the printer controller 12. The CPU 107 uses a second memory 108 as an area for temporarily storing data. An operating unit 109 includes buttons, keys, and a touch panel. The operator uses the operating unit 109 to operate the print processing apparatus. A display unit 110 displays text and images to provide the operator with information. Since the printer controller 12 includes the RIP 102 and the encoder 103, data described in a printer control language not supported by the image forming apparatus 13 can be printed.

Figure 10:
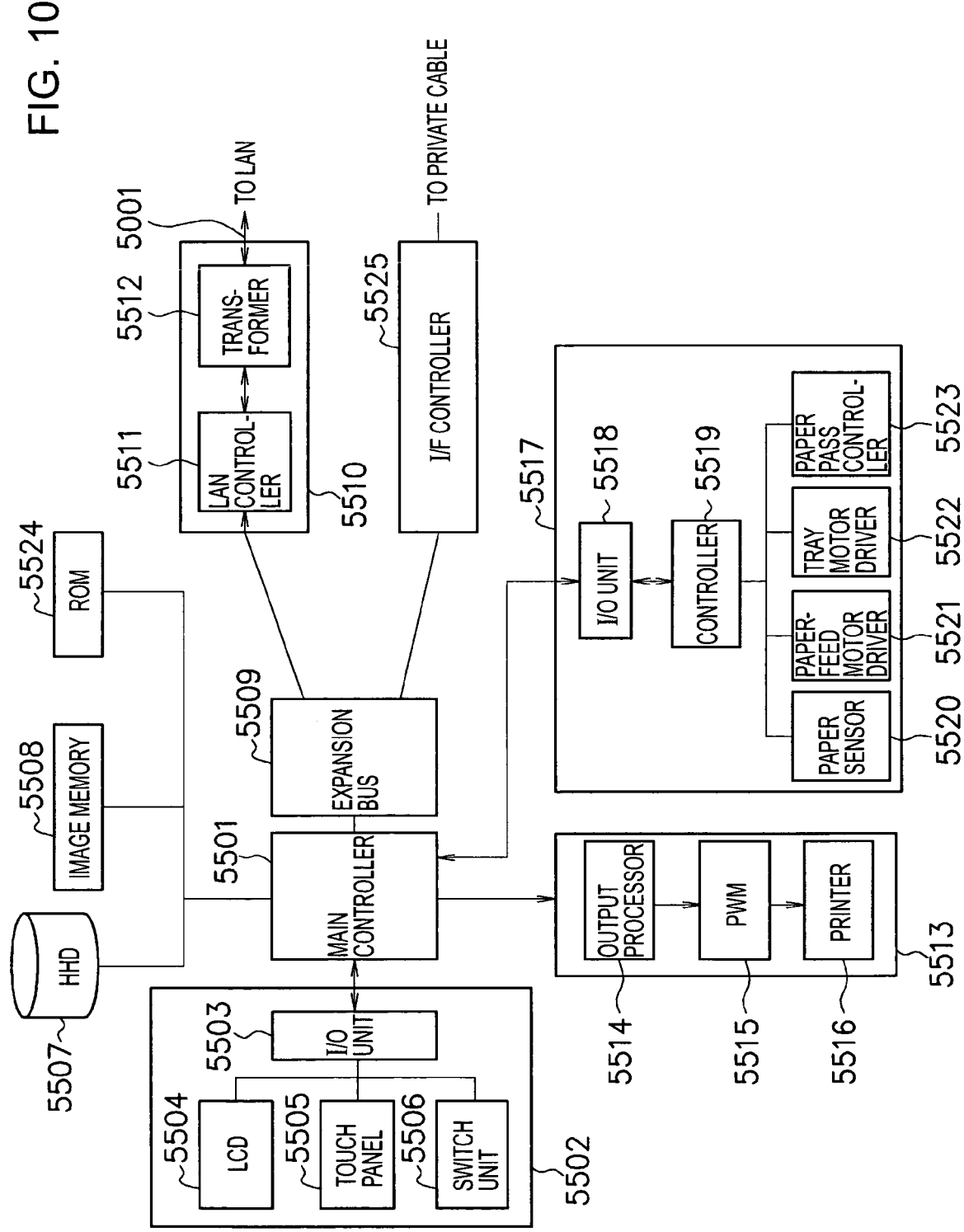
FIG. 10 is a block diagram showing an exemplary control structure of an image forming apparatus.

FIG. 10 is a block diagram showing an exemplary control architecture of the image forming apparatus 13. A main controller 5501 controls the image forming apparatus 13. The operator uses an operating section 5502 to operate the image forming apparatus 13. A liquid crystal display (LCD) 5504, a touch panel 5505, and a switch unit 5506 included in the operating section 5502 communicate with the main controller 5501 via an input/output (I/O) unit 5503. The LCD 5504 provides the operator with information and displays virtual switches. The touch panel 5505 detects the operation of virtual switches displayed on the LCD 5504. The physical switch unit 5506 is provided for the operator to operate the image forming apparatus 13. A hard disk drive (HHD) 5507 (or equivalent form of memory) stores print data and programs and serves as a data cache area. An image memory 5508 is used for expanding and processing print image data. A read only memory (ROM) 5524 is provided for supporting operations performed by the main controller 5501. An expansion bus 5509 is provided for enhancing the performance of the image forming apparatus 13. An NIC 5510 is added to the image forming apparatus 13 via the expansion bus 5509. A LAN controller 5511 performs control for monitoring communication packets transmitted over the LAN 5001, capturing the communication packets into the image forming apparatus 13, and transmitting communication packets generated by the image forming apparatus 13 to the LAN. A transformer 5512 performs voltage conversion and allows physical communication between the image forming apparatus 13 and the LAN. An interface (I/F) controller 5525 controls data transmission via the private cable. A print section 5513 prints images on paper as a recording medium. An output processor 5514 performs processing, such as gamma conversion, edge enhancement, and smoothing, to modify image data transmitted from the main controller 5501 to be suitable for being printed on paper. Image data processed by the output processor 5514 is converted by a pulse width modulator (PWM) 5515 into signals for driving a laser beam. A printer 5516 prints images on paper based on signals supplied in the form of a laser beam. A paper ejector 5517 ejects printed paper from the print section 5513 outside the image forming apparatus 13. The paper ejector 5517 communicates with the main controller 5501 via an I/O unit 5518. A controller 5519 controls the paper ejector 5517. A paper sensor 5520 monitors the flow of paper passing through the paper ejector 5517. A paper-feed motor driver 5521 drives a motor for feeding paper. A tray motor driver 5522 drives an output tray. A paper pass controller 5523 controls the flow of paper.

Figure 6:
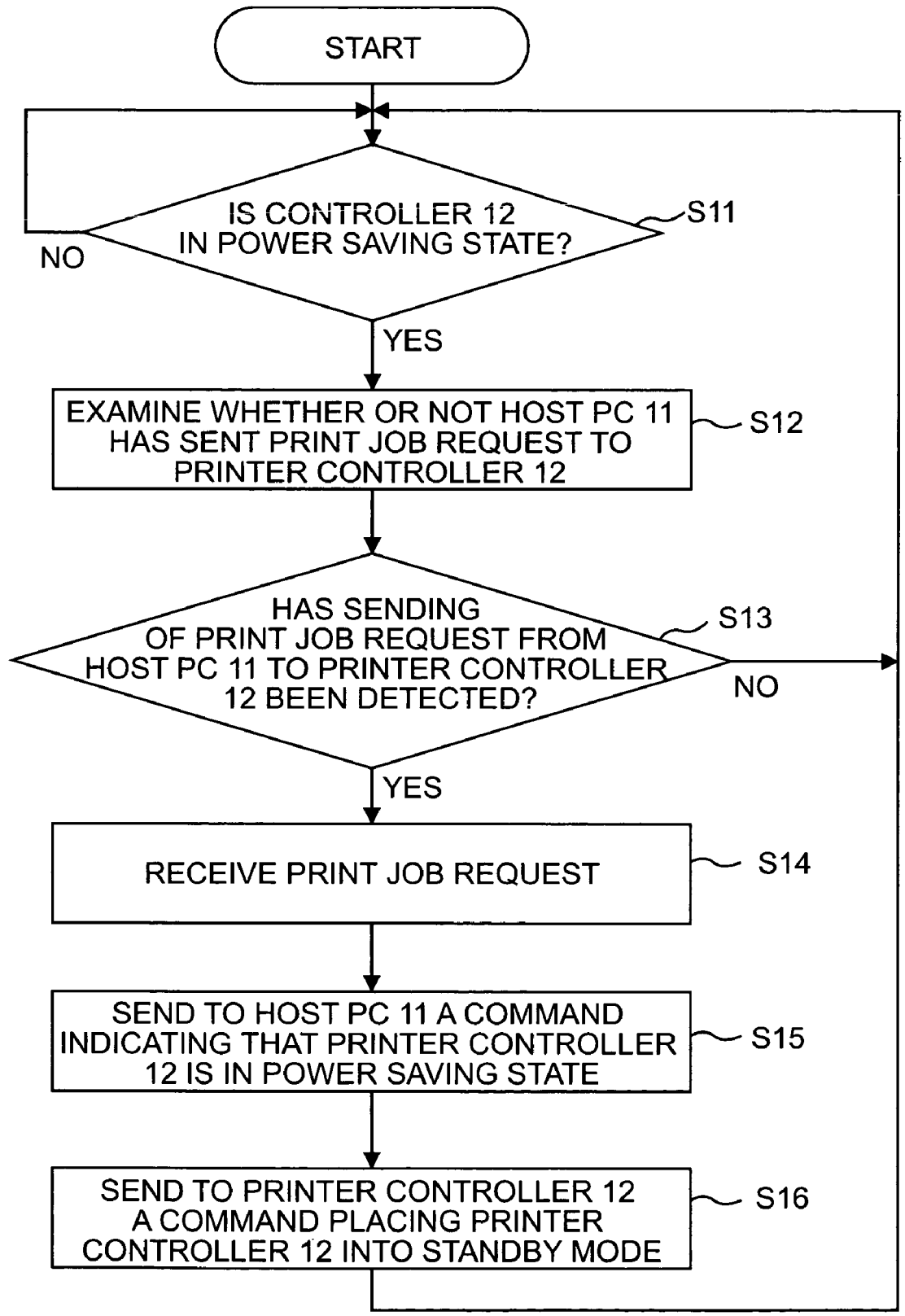
FIG. 6 is a flowchart showing exemplary information processing performed by an image forming apparatus according to the first embodiment of the present invention.

Information processing performed by the image forming apparatus 13 will now be described. FIG. 6 is a flowchart showing exemplary information processing performed by the image forming apparatus 13. For example, a CPU in the main controller 5501 of the image forming apparatus 13 performs this information processing according to a program based on the process in FIG. 6. In response to a print request from the user, the host PC 11 (assigned an IP address of 192.168.0.2 for illustrative purposes) sends, to the printer controller 12, a request to receive a print job. The print job request sent by the host PC 11 has a source address of 192.168.0.2 and a destination address of 192.168.0.3. However, the print job request cannot be received in the case in which the printer controller 12 is in a power saving state.

Then, the image forming apparatus 13 determines whether or not the printer controller 12 is in a power saving state (step S11). If the printer controller 12 is in a power saving state ("Yes" in step S11), the image forming apparatus 13 starts monitoring on the network a print job request addressed to the printer controller 12. The image forming apparatus 13 examines whether or not a print job request has been sent from the host PC 11 to the printer controller 12 (step S12). Then the image forming apparatus 13 determines whether or not the sending of a print job request has been detected (step S13). If detected, the image forming apparatus 13 receives the print job request (step S14). If the image forming apparatus 13 has not detected the sending of a print job request, the process returns to step S11.

When the image forming apparatus 13 has detected that a print job request has been sent to the printer controller 12, the image forming apparatus 13 recognizes, based on the source address of the print job request, the IP address of the host PC 11 that is the source of the print job request. Therefore, it is possible for the image forming apparatus 13 to send data to the IP address of the host PC 11. The image forming apparatus 13 thus sends, to the host PC 11, a command for causing the host PC 11 to display a screen 21 (see FIG. 2) informing the user that the printer controller 12 is in a power saving state (step S15). The command has a source address of 192.168.0.4 and a destination address of 192.168.0.2.

Figure 2:
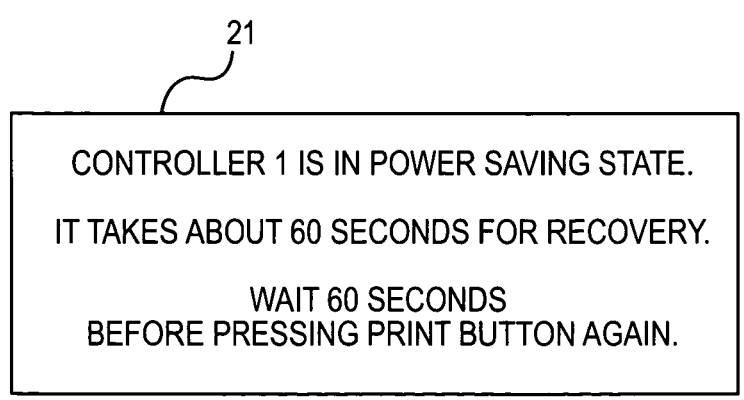
FIG. 2 shows an example of a screen display on a host PC according to the first embodiment of the present invention.

For example, the image forming apparatus 13 sends to the host PC 11 hyper text markup language (HTML) data for displaying the screen 21 shown in FIG. 2. Based on the HTML data, a Web browser for the host PC 11 displays the screen 21. As shown in FIG. 2, displaying the period of time required for the printer controller 12 to recover from a power saving state to standby mode informs the user of the time for recovery.

At the same time, the image forming apparatus 13 sends, via the private cable to the printer controller 12, a command for placing the printer controller 12 into standby mode ready for printing (step S16). Upon receipt of this command, the printer controller 12 starts operations for transition to standby mode. In standby mode, the electric power is supplied to the main circuit element of the printer controller 12 and the power saving state is released.

Figure 7:
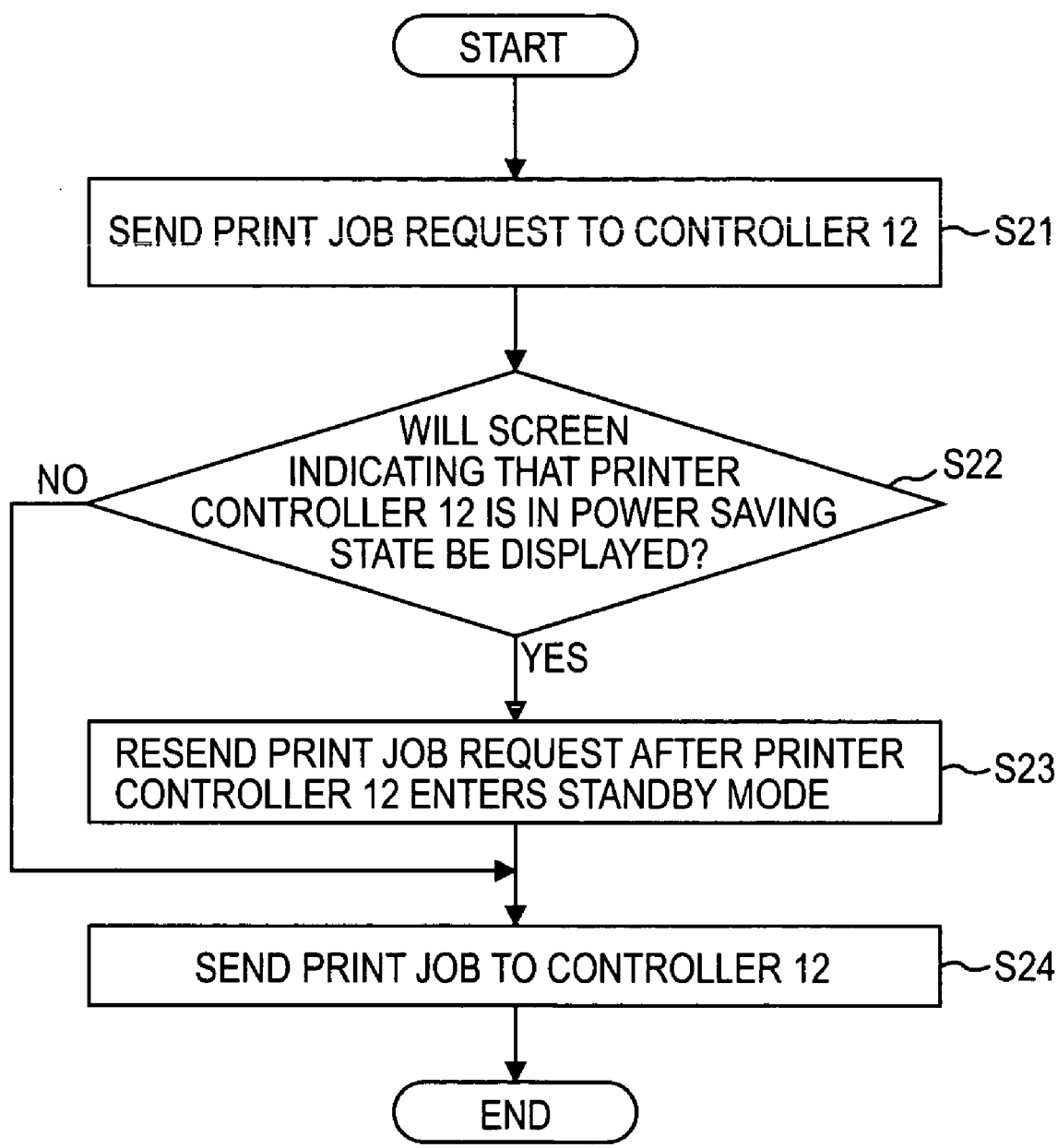
FIG. 7 is a flowchart showing an exemplary information processing performed by a host PC according to the first embodiment of the present invention.

Information processing performed by the host PC 11 will now be described. FIG. 7 is a flowchart showing exemplary information processing performed by the host PC 11. In response to a print request from the user, the host PC 11 sends a print job request to the printer controller 12 (step S21). The print job request has a source IP address of 192.168.0.2 and a destination IP address of 192.168.0.3. Then, the host PC 11 determines whether or not a command for displaying the screen 21 has been received (step S22). If the command has been received, the host PC 11 displays, based on received data, the screen 21 shown in FIG. 2. When the printer controller 12 enters standby mode ready for printing, the host PC 11 resends a print job request to the printer controller 12 in response to a further print request from the user (step S23). Then, the host PC 11 sends a print job to the printer controller 12 (step S24). Upon completion of predetermined processing performed, by the printer controller 12, on the print job, the image forming apparatus 13 performs printing based on the print job.

Second Exemplary Embodiment

In the second exemplary embodiment of the present invention, when a host PC sends a print job request to a printer controller in a power saving state, an image forming apparatus sends a specific Web page to the host PC. A Web browser for the host PC displays the Web page based on data in HTML or the like.

The structure of an image forming system according to the second embodiment of the present invention may be the same as that of the first embodiment. A printer controller 12 is connected to an image forming apparatus 13. Before entering a power saving state, the printer controller 12 sends, to the image forming apparatus 13, data informing that a power saving state is about to be entered. The image forming apparatus 13 is thus informed from the data that the printer controller 12 is about to enter a power saving state.

When the user performs printing, the host PC 11 sends, to the printer controller 12, a request to receive a print job. However, the print job request cannot be received in the case in which the printer controller 12 is in a power saving state.

A Web browser for the host PC 11 can send a hypertext transfer protocol (http) request to the image forming apparatus 13. In response to the http request, the image forming apparatus 13 sends to the host PC 11 a Web page indicating that the printer controller 12 is in a power saving state at the time of receiving a print request. This Web page informs the user that the printer controller 12 is in a power saving state. Moreover, displaying time for recovery from a power saving state to standby mode informs the user of the period of time required for recovery.

At the same time, the image forming apparatus 13 sends, to the printer controller 12 via the private cable connecting the printer controller 12 to the image forming apparatus 13, data for placing the printer controller 12 into standby mode ready for printing. Upon receipt of this data, the printer controller 12 starts operations for transition to standby mode.

When the printer controller 12 enters standby mode ready for printing, the user sends a print request again, the host PC 11 sends a print job to the printer controller 12, and the image forming apparatus 13 performs printing based on the print job.

Third Exemplary Embodiment

In the first and second embodiments described above, when the host PC sends a print job request to the printer controller in a power saving state, the image forming apparatus sends, to the host PC, information indicating that the printer controller is in a power saving state. In the third exemplary embodiment of the present invention, an image forming apparatus, after informing the user that a printer controller is in a power saving state, allows searching for another printer controller in standby mode.

Figure 3:
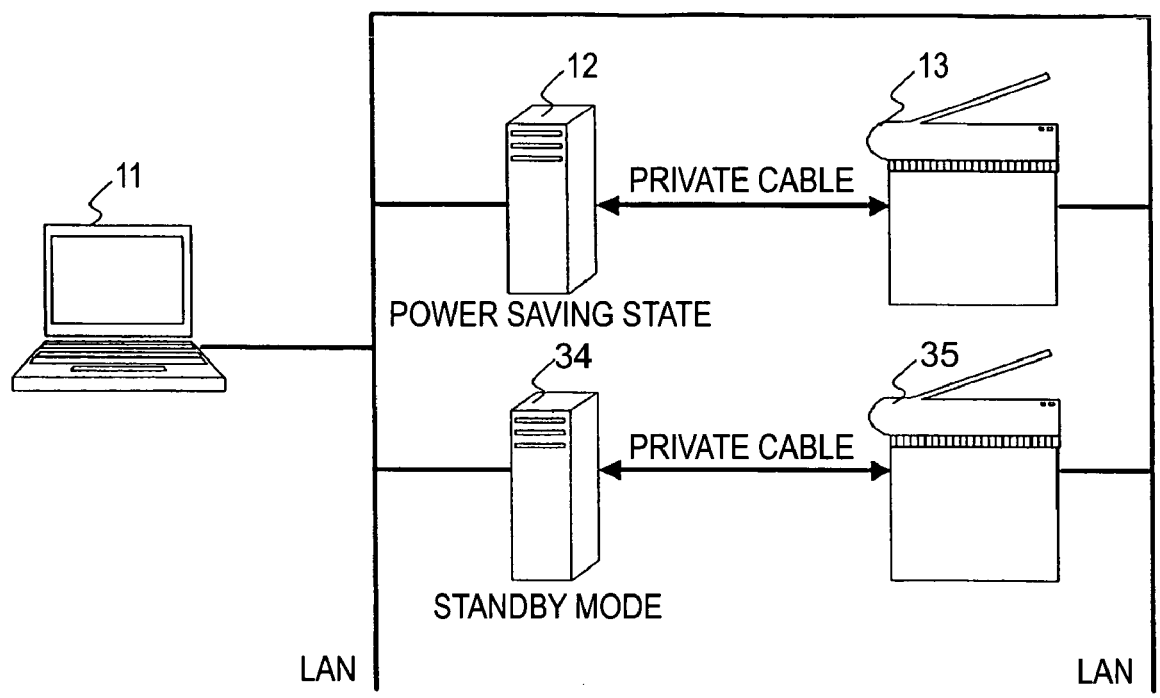
FIG. 3 shows an exemplary architecture of an image forming system according to a third embodiment of the present invention.

FIG. 3 shows the architecture of an exemplary image forming system according to the third embodiment of the present invention. Referring to FIG. 3, a host PC 11, a printer controller 12, an image forming apparatus 13, a printer controller 34, and another image forming apparatus 35 are connected to a LAN.

Figure 8:
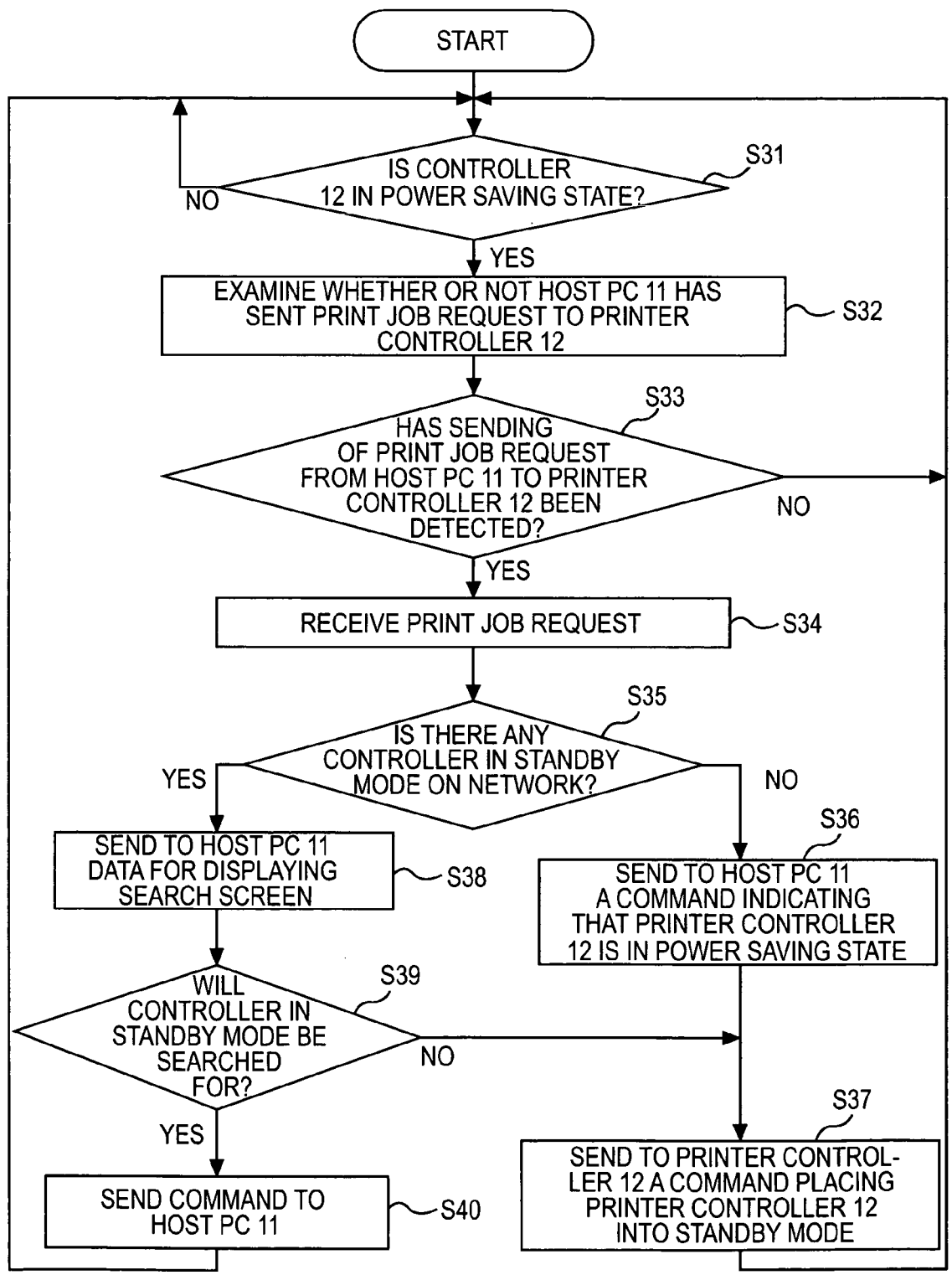
FIG. 8 is a flowchart showing an exemplary information processing performed by an image forming apparatus according to the third embodiment of the present invention.

FIG. 8 is a flowchart showing exemplary information processing performed by the image forming apparatus 13 of the third embodiment. For example, a CPU for a main controller of the image forming apparatus 13 performs this information processing according to a program based on the process in FIG. 8.

First, the image forming apparatus 13 determines whether or not the printer controller 12 is in a power saving state (step S31). If the printer controller 12 is in a power saving state ("Yes" in step S31), the image forming apparatus 13 starts monitoring on the network a print job request addressed to the printer controller 12. Then the image forming apparatus 13 examines whether or not a print job request has been sent from the host PC 11 to the printer controller 12 (step S32). Moreover, the image forming apparatus 13 determines whether or not the sending of a print job request has been detected (step S33). If the sending of the print job request has been detected in step S33, the image forming apparatus 13 receives the print job request (step S34). If the image forming apparatus 13 has not detected the sending of a print job request in step S33, the process returns to step S31.

In the case in which a plurality of printer controllers are connected to the host PC 11, even if a printer controller that is the destination of a print job request is in a power saving state, there may be other printer controllers that are in standby mode. The image forming apparatus 13 thus determines whether or not there is any printer controller in standby mode on the network (step S35). If, as shown in FIG. 3, the printer controller 12 is in a power saving state and the printer controller 34 is in standby mode, there can be a first print method in which the user waits for the printer controller 12 to enter standby mode. Alternatively, there can be a second print method in which a print job is sent to the printer controller 34 already in standby mode.

If there is no other printer controller in standby mode, the image forming apparatus 13 sends, to the host PC 11, a command for displaying the screen 21 (see FIG. 2) on the host PC 11 (step S36). When the image forming apparatus 13 has detected that a print job request has been sent to the printer controller 12, the image forming apparatus 13 recognizes, based on the source address of the print job request, the IP address of the host PC 11 that is the source of the print job request. Therefore, it is possible for the image forming apparatus 13 to send data to the IP address of the host PC 11. The command has a source address of 192.168.0.4 and a destination address of 192.168.0.2.

For example, the image forming apparatus 13 sends, to the host PC 11, HTML data for displaying the screen 21 shown in FIG. 2. Based on the HTML data, a Web browser for the host PC 11 displays the screen 21. As shown in FIG. 2, displaying the period of time required for the printer controller 12 to recover from a power saving state to standby mode informs the user of the time for recovery.

At the same time, the image forming apparatus 13 sends, via the private cable to the printer controller 12, a command for placing the printer controller 12 into standby mode ready for printing (step S37). Upon receipt of this command, the printer controller 12 starts operations for transition to standby mode.

Figure 4:
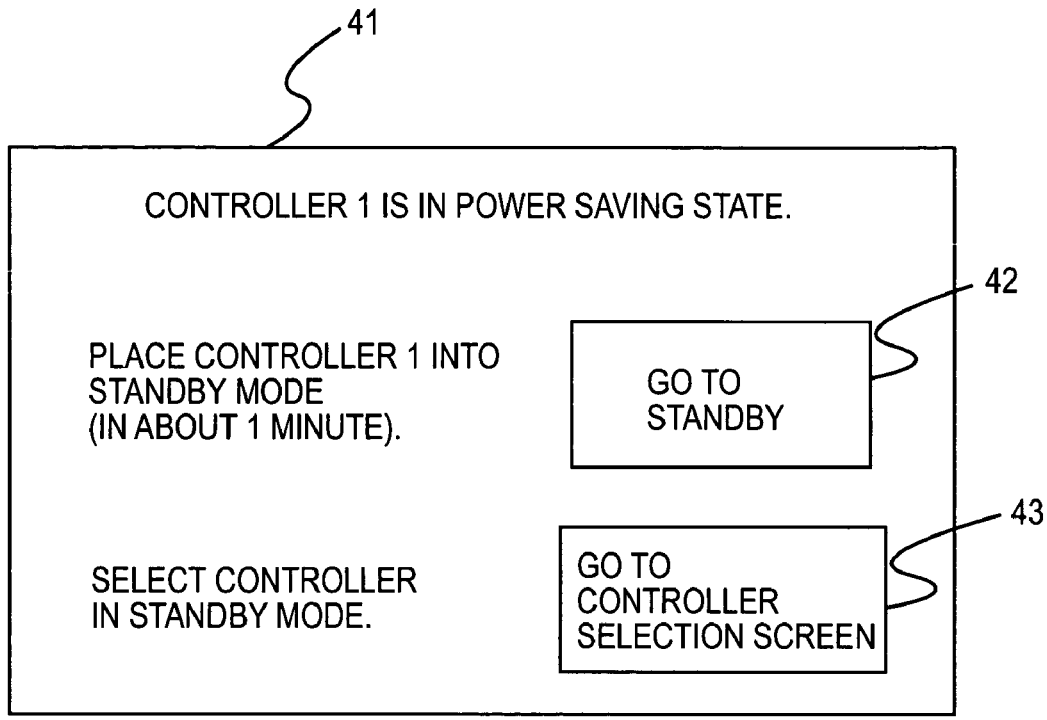
FIG. 4 shows an example of a screen display on a host PC according to the third embodiment of the present invention.

If there is any other printer controller in standby mode, the image forming apparatus 13 sends, to the host PC 11, data for displaying a search screen 41 in FIG. 4 on the host PC 11 (step S38). The host PC 11 displays the search screen 41 based on this data. The search screen 41 enables the user to select an option to place the printer controller 12 in a power saving state into standby mode. Alternatively, the user can select an option to search for, other than the printer controller 12, a printer controller in standby mode on the network.

Based on selection information described below, the image forming apparatus 13 determines whether or not to search for a printer controller in standby mode (step S39). If the user clicks on a selection button 42, selection information indicating that the user has selected an option to place the printer controller 12 in a power saving state into standby mode is sent to the image forming apparatus 13. Thus, the image forming apparatus 13 determines that the user will not search for a printer controller in standby mode and sends, via the private cable to the printer controller 12, data for placing the printer controller 12 into standby mode ready for printing (step S37). Upon receipt of this data, the printer controller 12 starts operations for transition to standby mode.

Figure 5:
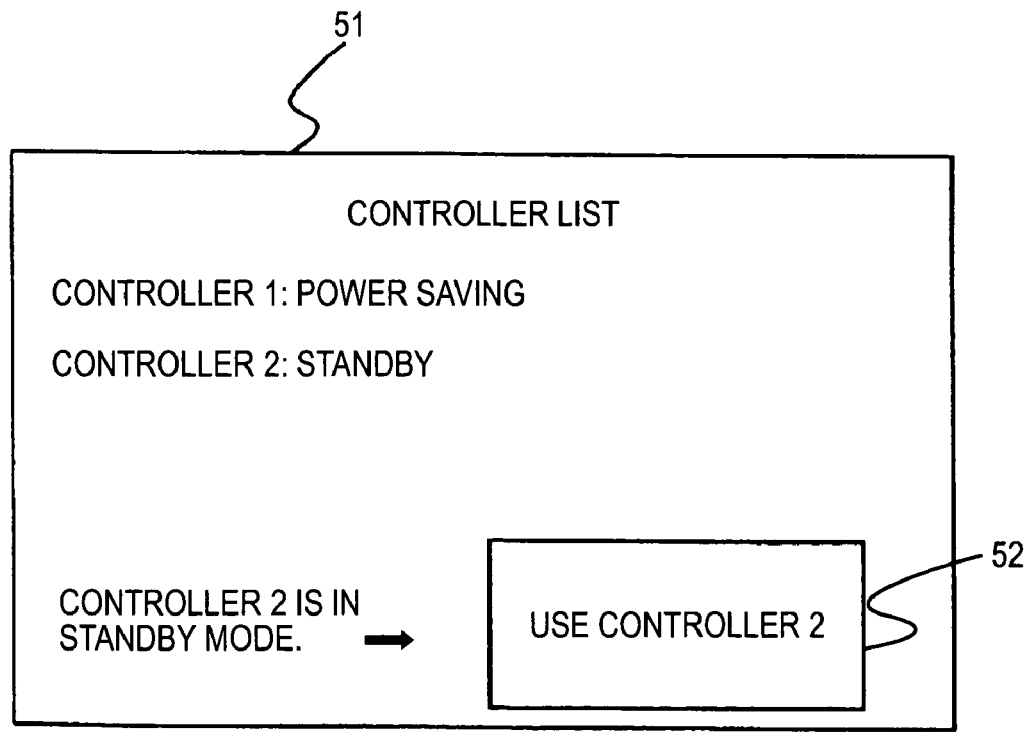
FIG. 5 shows another example of a screen display on a host PC according to the third embodiment of the present invention.

If the user clicks on a selection button 43 on the search screen 41 in FIG. 4, selection information indicating that the user has selected an option to display a search result is sent to the image forming apparatus 13. Thus, the image forming apparatus 13 determines that the user will search for a printer controller in standby mode, and searches other printer controllers connected to the host PC 11. Then the image forming apparatus 13 sends, to the host PC 11, a command for displaying a screen shown in FIG. 5 on the host PC 11 (step S40). The screen in FIG. 5 provides a printer controller list 51 and a selection button 52 enabling the user to select the printer controller 34 as the destination of a print job. If the printer controller 34 is in standby mode, the host PC 11 can display information indicating that the printer controller 34 is in standby mode, and can send a print job to the printer controller 34. The user clicks on the selection button 52 to select the printer controller 34 as the destination of a print job, thereby sending a print request again. When the printer controller 34 receives a print job from the host PC 11, the image forming apparatus 35 connected to the printer controller 34 performs printing based on the print job.

According to the embodiments described above, if a print request is sent from the host PC to the printer controller in a power saving state, the image forming apparatus informs the host PC that the printer controller is in a power saving state. Since this informs the user that the printer controller is in a power saving state, the printer controller can switch to a power saving state and reduce its power consumption. The present invention may also be configured such that typical processing, such as informing processing, of the image forming apparatus described above is performed by another information processing apparatus.

In the present invention, a storage medium on which a software program code for performing the functions of the above-described embodiments is recorded may be supplied to a system or apparatus such that a computer (or CPU or microprocessing unit (MPU)), that is, the system or apparatus reads out and executes the program code stored in the storage medium.

In this case, the program code read out from the storage medium performs the functions of the above-described embodiments. Therefore, the program code and the storage medium on which the program code is recorded constitute another aspect of the present invention.

The storage medium for supplying the program code may be, for example, a flexible disk, a hard disk, an optical disk, a magneto-optical disk, a compact-disk read-only memory (CD-ROM), a CD-recordable (CD-R), a magnetic tape, a non-volatile memory card, a ROM or the like.

The functions of the above-described embodiments can be performed not only by a computer reading and executing the program code, but also by an OS running on the computer and executing a whole or part of the actual processing in accordance with instructions of the program code.

The functions of the above-described embodiments can also be performed, after the program code read out from the storage medium is written in a memory of a function expansion board in a computer or is written in a memory of an expansion unit connected to a computer, by a CPU or the like, which is included in the function expansion board or expansion unit, executing a whole or part of the actual processing in accordance with instructions of the program code.

The present invention is configured such that if a print processing apparatus, such as a printer controller or a print server, is in a power saving state when a print request has been sent, the user is informed that the print processing apparatus is in a power saving state. Therefore, even if the timeout of a print request occurs because the print processing apparatus is in a power saving state, the cause of the timeout can be known to the user.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-311412 filed Oct. 26, 2004, which is hereby incorporated by reference herein in its entirety.

What is claimed is:

1. A printing apparatus connected to a print data generating apparatus which apparatus, the print data generating apparatus receiving a print job from an external apparatus in response to a reception of a print request from the external apparatus and generating print data based on the received print job, the printing apparatus comprising:
    a receiving unit configured to receive the print data generated by the print data generating apparatus, wherein the print data generating apparatus generates the print data in response to the reception of the print job in a case where the print data generating apparatus is in a standby mode;
    a printing unit configured to perform printing processing based on the print data received by the receiving unit;
    a determining unit configured to determine whether or not the print data generating apparatus is in a power saving mode incapable of receiving the print request for the printing apparatus transmitted from the external apparatus, the print request being transmitted from the external apparatus in response to an instruction for printing from a user of the external apparatus;
    a detecting unit configured to detect the print request for the printing apparatus which is transmitted from the external apparatus to the print data generating apparatus when the determining unit determines that the print data generating apparatus is in the power saving mode;
    a control-data sending unit configured to send control data for releasing the power saving mode of the print data generating apparatus to the print data generating apparatus when the detecting unit detects the print request sent from the external apparatus to the print data generating apparatus; and
    a notifying unit configured to notify the external apparatus of a timing suitable for the user of the external apparatus to input the instruction for printing when the detecting unit detects the print request for the printing apparatus, wherein the timing corresponds to time required for the print data generating apparatus to switch from the power saving mode to the standby mode in response to the control data sent by the control-data sending unit.

2. The printing apparatus according to claim 1, further comprising a second receiving unit configured to receive a request, from the external apparatus, for notification by the notifying unit, wherein the notifying unit notifies the external apparatus of the timing when the request is received by the second receiving unit.

3. The printing apparatus according to claim 1, further comprising a searching unit configured to search for a second print data generating apparatus which is for receiving the print job from the external apparatus and for generating print data based on the received print job in the standby mode, wherein
    the notifying unit further notifies the external apparatus of the second print data generating apparatus searched by the searching unit.

4. The printing apparatus according to claim 1, wherein said notifying unit notifies the external apparatus by sending a web page for causing a web browser of the external apparatus to display that the print data generating apparatus is in the power saving mode, when the detecting unit detects the print request for the printing apparatus.

5. The printing apparatus according to claim 1, wherein said notifying unit notifies the external apparatus by sending an information for requesting the external apparatus to send the print job in a case where the print data generating apparatus is recovered from the power saving mode to the standby mode.

6. A control method for a printing apparatus connected to a print data generating apparatus which receives a print job from an external apparatus in response to a reception of a print request from the external apparatus and generates print data based on the received print job, the control method comprising:
    receiving the print data generated by the print data generating apparatus, wherein the print data generating apparatus generates the print data in response to the reception of the print job in a case where the print data generating apparatus is in a standby mode;
    performing printing based on the received print data;
    determining whether or not the print data generating apparatus is in a power saving mode incapable of receiving the print request for the printing apparatus which is transmitted from the external apparatus, the print request being transmitted from the external apparatus in response to an instruction for printing from a user of the external apparatus;
    detecting the print request for the printing apparatus which is transmitted from the external apparatus to the print data generating apparatus in a case where it is determined that the print data generating apparatus is in the power saving mode;
    sending control data for releasing the power saving mode of the print data generating apparatus to the print data generating apparatus when the print request sent from the external apparatus to the print data generating apparatus is detected; and
    notifying the external apparatus of a timing suitable for the user of the external apparatus to input the instruction for printing when the print request for the printing apparatus is detected, wherein the timing corresponds to time required for the print data generating apparatus to switch from the power saving mode to the standby mode in response to the sent control data.

7. A non-transitory computer-readable recording medium containing computer-executable instructions for a printing apparatus connected to a print data processing apparatus which receives a print job from an external apparatus in response to a reception of a print request from the external apparatus and generates print data based on the received print job, the non-transitory computer-readable recording medium comprising:

computer-executable instructions for receiving the print data generated by the print data generating apparatus, wherein the print data generating apparatus generates the print data in response to the reception of the print job in a case where the print data generating apparatus is in a standby mode;

computer-executable instructions for performing printing based on the received print data;

computer-executable instructions for determining whether or not the print data generating apparatus is in a power saving mode incapable of receiving the print request for the printing apparatus which is transmitted from the external apparatus, the print request being transmitted from the external apparatus in response to an instruction for printing from a user of the external apparatus;

computer-executable instructions for detecting the print request for the printing apparatus which is transmitted from the external apparatus to the print data generating apparatus in a case where it is determined that the print data generating apparatus is in the power saving state;

computer-executable instructions for sending control data for releasing the power saving mode of the print data generating apparatus to the print data generating apparatus when the print request sent from the external apparatus to the print data generating apparatus is detected; and computer-executable instructions for notifying the external apparatus of a timing suitable for the user of the external apparatus to input the instruction for printing when the print request for the printing apparatus is detected, wherein the timing corresponds to time required for the print data generating apparatus is to switch from the power saving mode to the standby mode.

\* \* \* \* \*